June 29, 1971 R. M. COGAN 3,588,980
METHOD FOR MAKING A CONTOURED ARTICLE
Filed July 17, 1969
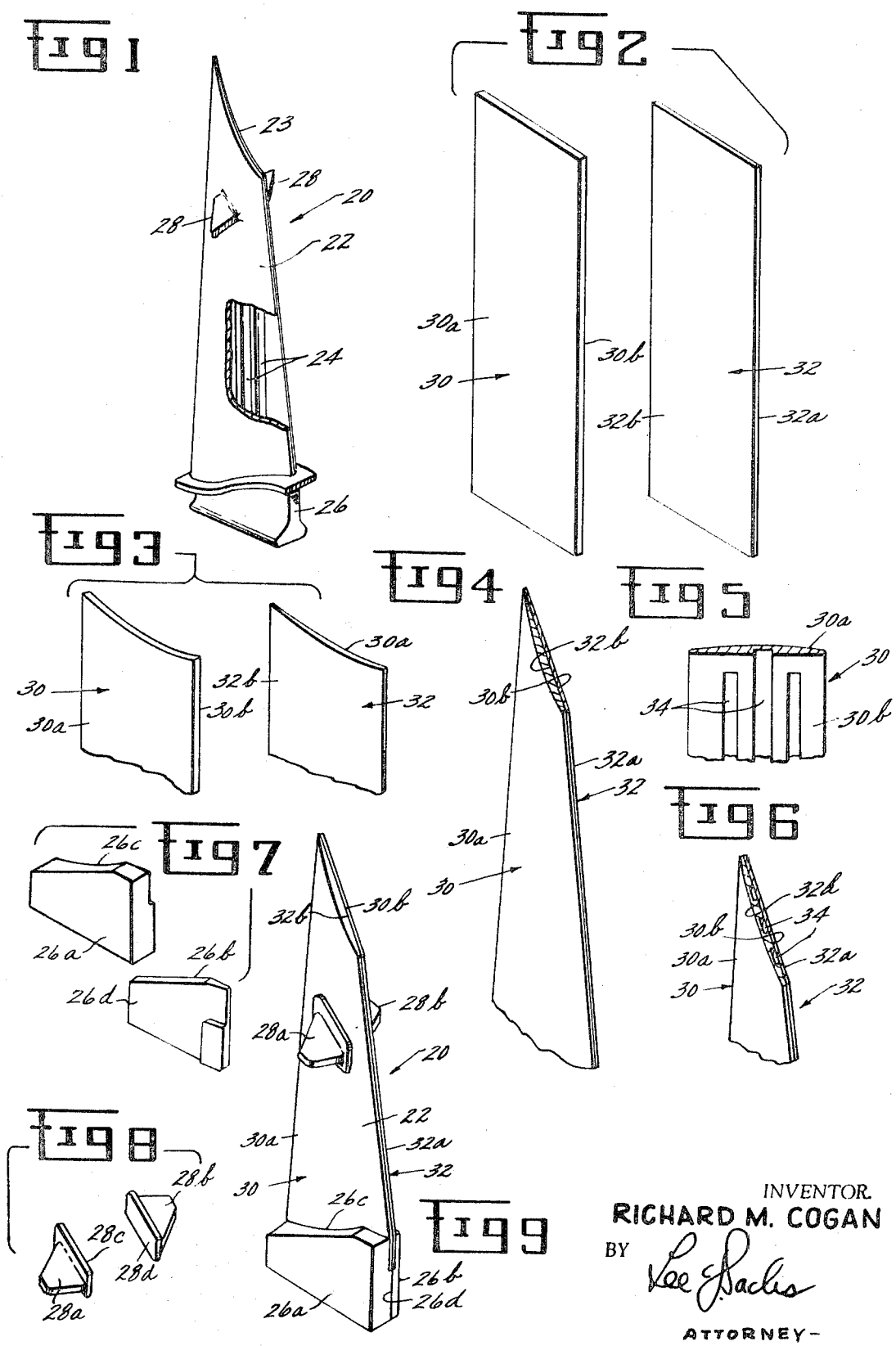
INVENTOR.
RICHARD M. COGAN
BY Lee Backes
ATTORNEY United States Patent Office 3,588,980
Patented June 29, 1971

3,588,980
METHOD FOR MAKING A CONTOURED ARTICLE
Richard M. Cogan, Cincinnati, Ohio, assignor to
General Electric Company
Filed July 17, 1969, Ser. No. 842,666
Int. Cl. B21k *3/04;* B23p *15/02, 15/04*
U.S. Cl. 29—156.8                              3 Claims

ABSTRACT OF THE DISCLOSURE

A hollow contoured article, such as a turbomachinery blade or vane, having a hollow internal portion can be made from mill stock by separately forming a plurality of members from mill stock shape and then forming an unbonded assembly of such members. The members are then separated for removal of selected internal material prior to bonding the assembly of members.

---

One requirement in the development of high performance gas turbine engines, such as those used to power aircraft, is the development of strong, lightweight components some of which are of very complex contour. Typical of such components are complex contoured hollow jet engine compressor or turbine blades and vanes. In many cases, it is desirable to provide such components with internal cavities either for weight reduction or to cool the component during operation. The invention herein described was made in the course of or under a contract, or a subcontract thereunder, with the United States Department of the Air Force.

There are various chemical, mechanical, electrical and electrolytic methods for removing selected material from cast or forged, substantially finished articles. However, the component thinness, complex contour and sometimes difficult-to-work material present costly and difficult to solve manufacturing problems. Development of the widely reported and now generally used solid state diffusion bonding technique has helped to solve some manufacturing problems by allowing individually manufactured members of a component to be joined through a relatively strong bond. However, manufacture of the individual members to be joined presents a problem because of the close tolerance fit or minimum gap required between members. Hence the tooling to forge, cast, machine, etc. the individual members to achieve close fit and the manufacturing steps to produce the members o be joined are costly. Furthermore, it is difficult to control and make uniform, one to the other, the properties of individually prepared members.

It is a principal object of the present invention to provide an improved method for making a contoured article having a hollow inner portion by bonding a plurality of members each produced from mill stock shapes such as bar, rod, plate and sheet.

Another object is to provide an improved method for making such a contoured article from a plurality of members the shapes of which are matched one with the other as a result of their being formed as an unbonded assembly.

These and other objects and advantages will be more fully understood from the following detailed description, drawing and examples which are meant to be typical of a hollow contoured article and not limiting on the scope of the present invention.

In the drawing:
FIG. 1 is an isometric, partially sectional view of a gas turbine blade including hollow inner portions;
FIG. 2 is an isometric view of sheet and plate mill stock;
FIG. 3 is a fragmentary isometric view of the sheet of FIG. 2 formed into rough blade contour;
FIG. 4 is a fragmentary, partially sectional isometric view of a first airfoil assembly made from the members of FIG. 3;
FIG. 5 is a fragmentary partially sectional view of one of such members including inner channels;
FIG. 6 is a fragmentary partially sectional isometric view of a second airfoil assembly including hollow inner portions;
FIGS. 7 and 8 are isometric views of blade base blocks and mid spans, respectively; and
FIG. 9 is an isometric view of a blade preform made from the members of FIGS. 6, 7 and 8.

In one of its broader aspects, the method of the present invention for making a contoured article having a hollow inner portion involves the steps of first providing a plurality of members each of which is in a mill stock shape and each having an inner and outer surface. Each member is formed so that its outer surface relates in contour to a portion of the outer surface of the article so that together the outer surfaces of the plurality of the members relate in shape to the outer surface of the article. The inner surface of each of the members is prepared so that it matches in shape with the inner surface of other members with which it is subsequently to be bonded.

The plurality of members are then assembled into an article preform assembly by aligning the inner surfaces in juxtaposition and in substantial contact, though across a gap, so that the outer surfaces of the members define an article preform. The article preform assembly is then formed, such as by hot creep forming in a die, into a first article assembly. Such assembly can be virtually in finished contoured article shape with or without a planned thin protective envelope of material subsequently to be removed after bonding. Because the members have been formed together in making the preform assembly, their contacting surfaces are matched very closely one with the other across minimum gaps readily adaptable to solid state diffusion bonding techniques.

After forming of the preform assembly, the plurality of members are separated one from the other and selective material is removed from at least one of the members at its inner surface. This provides the hollow portion of the article. The plurality of members are then reassembled into a second article assembly, one including a hollow inner portion, bonded at their inner surfaces.

Practice of the present invention using mill stock to replace the typical forgings previously used provides a lower cost source of raw material with an increase in material utilization. No forging tooling is required. Uniform material properties can better be assured by controlling mill practices, for example rolling, in lieu of controlling upset and finish temperature work. Such process control is required in a forging having major differences of mass between portions of an article such as between the airfoil section and a base of a turbomachinery blade. Thus through practice of this invention, improved tolerance control of the individual members can be achieved. Furthermore, because the members are assembled into a preform assembly and then prepared into the shape which closely approximates that of the finished contoured article, close fit-up or mating of members is provided. In known methods using solid state diffusion bonding, mating surfaces to be joined are separately prepared and shaped to match one with the other. Forming the individual members together in the preform assembly, according to the method of the present invention, assures the close fit necessary for solid state diffusion bonding but so costly and difficult to achieve by other methods.

The present invention will be described in connection with hollow, complex contoured blades of the type used in jet engines because that represents one of the more useful applications of the present invention and because their shape and contour presents complex problems in manufacturing. Such problems are amplified by the provision of complex base portions or of platform, mid span or tip portions included on portions of the airfoil. However, it should be understood that the present invention can be applied to a variety of types, shapes and sizes of contoured articles.

Referring to the drawing, the isometric, partially sectional view of FIG. 1 shows a hollow blade 20 of the type which can be made according to the method of the present invention. The blade includes a hollow airfoil portion 22 within which are hollow portions 24. If desirable for mounting, the blade can include a base 26 and may include on its airfoil a platform-type or mid span structure 28.

Airfoil 22 can be made according to the present invention from mill stock represented in FIG. 2 as plate 30 and sheet 32, although both members could be plate as well. Member or plate 30 has an outer surface 30a and an inner surface 30b. Sheet 32 has an outer surface 32a and an inner surface 32b.

Prior to practice of the method of the present invention, members 30 and 32 can be prepared such as by skim machining or generally surface finishing to remove any contamination. Each is then formed such as by hot forming in a creep die to a rough contour, related to the contour of airfoil 22, as shown in FIG. 3. Although the contour of airfoil 22 in FIG. 1 is more complex, for example because of its twist, than are the shapes of rough contoured members 30 and 32 in FIG. 3, the contour of such members in FIG. 3 can be generated from measurements of the finished airfoil 22 and related to the die from which members 30 and 32 are generated. If sheet is used as member 32, it is generally not necessary to relate its shape at this point in the processing to the airfoil type contour of the airfoil 22.

After preliminary forming of each member 30 or 32 or both, their inner surfaces are prepared, such as by machining, so that their shapes match one with the other. This allows them to be assembled for subsequent operation. In the arrangement shown in the drawing, such inner surfaces were machined flat for simplicity and accuracy. Because airfoil 22 is thinner as it approaches airfoil tip 23, one or both of surfaces 30b and 32b can be machined flat while at the same time tapering member 30 or member 32 or both to be thinner toward the portion which will become blade tip 23.

The members thus prepared are aligned with their inner surfaces in substantial contact one with the other except for a mismatch gap which generally exists between the members. This arrangement creates an article or blade preform assembly which, though aligned and held together, is not bonded. The preform assembly is then formed, such as by hot creep forming, into a first article or airfoil assembly as shown in FIG. 4. The preform assembly has the substantial shape and contour of the finished airfoil except for an envelope of protective surface material, if one is designed to be allowed. The envelope is later removed such as by chemical milling. Formation of the preform assembly into a first article assembly with the members aligned and held together during forming, but not bonded, provides inner surfaces between members with a minimum mismatch or gap. It inherently prepares the shape of such surfaces for solid state diffusion bonding. As was mentioned before, such a bonding procedure requires very close tolerances which, in other methods, were obtained only by preparation of each of the members individually rather than in mated relationship as in the present invention.

After preparation of the first article assembly, the members 30 and 32 are separated one from the other and selected material is removed from one or more of the members at its inner surface. For example, as shown in FIG. 5, member 30 has had removed through its inner surface 30b, such as by mechanical machining or chemical milling, channels, grooves, depressions, etc. 34, some of which may traverse the length of the member or may terminate within the member as desired for its intended purpose. As was mentioned before, some material can be removed for reduction in weight. Other material can be removed for cooling purposes or for access of fluids.

After material has been removed from at least one of the members through its inner surface, the members are reassembled into a second article or airfoil assembly, FIG. 6. As contrasted with the first article assembly, such second assembly includes a hollow inner portion. The second assembly is then bonded such as through the ordinary high temperature solid state diffusion bonding process. In such a process, the atoms of the material at the interface between members acquire increased energy from the applied heat and in time migrate across the joint, thus growing continuous grains. This reduces a solid state bond the quality of which depends on the time, temperature and pressure between members during processing. In general, the effect of heat is to increase the rate of diffusion and to decrease the time required to achieve the bond; the effect of pressure is to reduce surface roughness and to produce an intimate fit of the parts. As was mentioned before, practice of the method of the present invention in producing the first article assembly from the preform assembly of a plurality of members inherently creates an intimate fit of the members. This results in a better bond, more easily achieved.

In one example, an airfoil fabricated according to the method of the present invention as described above, was prepared from a titanium base alloy nominally consisting essentially of, by weight, 6% Al, 4% V with the balance titanium and incidental impurities. In this example, both member 30, which represents the convex airfoil member, and member 32, which represents the concave airfoil member as shown in the drawing, were initially plate. After forming in a creep form die at a temperature of about 1450° F., machining flat to a 32 root means square surface finished and cleaning in methyl ethyl ketone, the two members were assembled into the preform assembly as described before. The assembly was placed in a preform die at about 1450° F. under about 1000 p.s.i. pressure for about 20 minutes. Mismatch or gap between the inner surfaces was found at this point to be a maximum of 0.005".

The members were then separated and selected material was removed from the inner surfaces 30b and 32b by chemical milling in a commercially available chemical milling solution called "Turco TFE200" at about 110° F.

The members thus prepared were cleaned in acetone and etched in a solution of 15% $HNO_3$, 5% HF with a balance water. They were then reassembled into the second article or airfoil assembly of the type shown in FIG. 6 and placed in conforming dies in a creep form press for ½ hour under a load of about 1000 p.s.i. in vacuum to solid state diffusion bond surfaces 30b and 32b.

The article resulting from the above described processing of the Ti-6Al-4V members was airfoil 22 of FIG. 1 without base 26 or platform member 28. Members from which base 26 or optionally platform 28 are produced together and to airfoil 28 in the same manner as were the members which created the airfoil 22. For example, as shown in FIGS. 7 and 8, convex base block 26a, concave base block 26b, convex mid span 28a and concave mid span 28b can be provided from bar stock. Through a machining operation, their respective inner surfaces 26c, 26d, 28c and 28d match the airfoil contour to which they are intended to be bonded. They are then aligned and can be solid state diffusion bonded to the airfoil 22 to result in the blade preform of FIG. 9.

As was mentioned before, airfoil 22 in the preform state can include a thin envelope of material for contamination protection during processing. After bonding of the base blocks or members 26a and 26b, and if required the mid span members 28a and 28b, the blade preform can be subjected to a chemical milling or etching solution to remove any protective envelope of material and to provide a blend radius for machining of the protruding members such as base members 26a and 26b.

A final operation generally involves finish machining of the newly added members as well as an additional blending of the airfoil edges. This then produces the hollow contoured blade of FIG. 1 from mill stock rather than from expensive and more difficult to control forgings and without the requirement for complex and expensive tooling.

Thus the present invention provides a method for making a contoured article, particularly one that is complex in contour, as is the above described airfoil, from a plurality of mill stock based members. Such members have been formed together, thus to provide mating surfaces readily adaptable for such bonding methods as solid state diffusion bonding. As such method relates to the manufacture of a turbomachinery blade, it has been shown how various other members and protrusions of like or compatible material are readily bondable to the article which results from practice of the basic method of the present invention.

What is claimed is:

1. In a method for making a contoured article having a hollow inner portion and an outer surface, the steps of:
    providing a plurality of members, each in mill stock shape and each having an inner and an outer surface;
    forming each member so that its outer surface relates in contour to a portion of the outer surface of the article and so that together the outer surfaces of the plurality of the members relate in shape to the outer surface of the article;
    preparing the inner surfaces of the members so that their shapes match one with another;
    assembling the plurality of members into an article preform by aligning the inner surfaces in juxtaposition and in substantial contact one with another;
    forming the preform assembly into a first article assembly;
    separating the plurality of members of the first article assembly;
    removing selected material from at least one of the members at its inner surface;
    reassembling the plurality of members into a second article assembly; and then
    bonding the plurality of members at their inner surfaces.

2. In a method as in claim 1 for making a hollow turbomachinery blade including an airfoil having a concave portion, a convex portion and leading and trailing edges and in which:
    there is provided first and second members;
    the first member is formed so that its outer surface relates in contour to the outer surface of the hollow blade concave portion and the second member is formed so that its outer surface relates in contour to the outer surface of the hollow blade convex portion; and
    the bonding of the first and second members in solid state diffusion bonding.

3. In the method of claim 2 for making a hollow turbomachinery blade including a base in addition to the airfoil, the additional steps of:
    providing a plurality of base members having an inner surface matched with a portion of the airfoil outer surface;
    aligning the inner surfaces of the base members in juxtaposition and in substantial contact with the outer surface portion of the airfoil with which they are matched; and then
    bonding the base members to the airfoil.

References Cited

UNITED STATES PATENTS

| | | | |
|---|---|---|---|
| 2,916,808 | 12/1959 | Wilkes | 29—156.8H |
| 2,954,208 | 9/1960 | Ewald | 29—156.8R |
| 2,958,933 | 11/1960 | Howald | 29—156.8H |
| 3,067,982 | 12/1962 | Wheeler | 29—156.8H |

JOHN F. CAMPBELL, Primary Examiner

D. P. ROONEY, Assistant Examiner

U.S. Cl. X.R.

253—39.1